United States Patent Office 3,437,667
Patented Apr. 8, 1969

3,437,667
OZONOLYSIS OF HALOBICYCLODIOLEFINS
AND PRODUCTS DERIVED THEREFROM
Robert C. Slagel, Burnsville, Minn., assignor to Ashland
Oil & Refining Company, Ashland, Ky., a corporation
of Kentucky
No Drawing. Filed Sept. 30, 1965, Ser. No. 491,806
Int. Cl. C07d 17/00, 19/00
U.S. Cl. 260—338                                    7 Claims

ABSTRACT OF THE DISCLOSURE

A process for preparing bicyclic peroxides of the formula

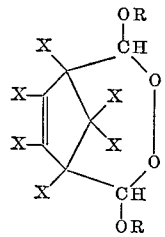

by reacting a hexahalobicyclodiolefin of the formula

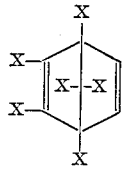

with ozone in the presence of a solvent of the formula $$R\text{—}OH$$

wherein R is hydrogen, and alkyl of 1–10 carbon atoms, or an acyl of 1–10 carbon atoms, and X is halogen. A process for preparing a compound of the formula

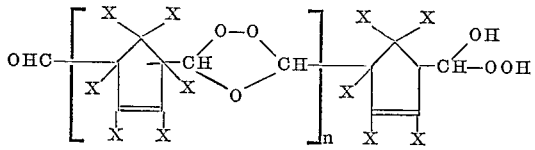

by reacting the hexahalobicyclodiolefin with ozone in the presence of a solvent such as carbon tetrachloride or heptane. A process for preparing an aldehydic ester hydrate of the formula

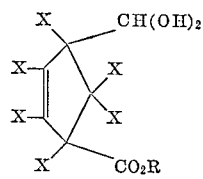

or a dicarboxylic acid for the formula

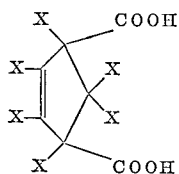

by reacting the above-mentioned bicyclo peroxide with a protonic solvent or with water.

This invention relates to a process for the ozonolysis of halobicyclodiolefins and to the active oxygen-containing intermediates and derivatives thereof obtained thereby. More particularly, the present invention is directed to a process for preparing active oxygen-containing intermediates and derivatives of highly-halogenated bicyclo (2.2.1) heptadienes.

Ozonolysis has been widely used in the laboratory as a synthetic method for the preparation of certain aldehydes and acids. The application of the method has been limited by the fact that many ozonides are explosive. Ozone reacts rapidly with isolated open-chain ethylenic linkages and much less rapidly with two or more conjugated double bonds or those present in aromatic ring systems. It is known in the art that olefinically unsaturated organic compounds containing one or more double bonds will react with ozone; however, those compounds which have halogen-substituted double bonds react very slowly with ozone. When the reaction is conducted in the presence of a solvent which is reactive with the ozonolysis intermediate under the conditions of reaction, e.g., methanol, formic acid, acetic acid, etc., the product formed is a peroxidic inter-reaction product of the ozone, solvent and unsaturated organic reactant which contains substituent groups, e.g., alkoxy groups, derived from the solvent. When the reaction is conducted in the presence of a solvent which is essentially inert to the ozonolysis intermediate under the conditions of reaction, e.g., carbon tetrachloride, chloroform, ethyl acetate, etc., the reaction proceeds by a different mechanism to form an ozonide.

The term "ozonolysis" employed herein means the cleavage by ozone of organic molecules at unsaturated linkages.

The term "ozonide" employed herein means a compound formed by the reaction of ozone with an unsaturated organic compound, which has the structure:

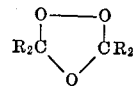

wherein R is a hydrocarbon radical.

The term "ozonolysis intermediate" as employed herein means the active oxygen-containing compound which results when an unsaturated organic material is reacted with ozone.

The term "participating solvent" employed herein means a solvent which is reactive with an ozonolysis intermediate.

Likewise, the term "non-participating solvent" employed herein means a solvent which is not reactive with an ozonolysis intermediate.

The ozonolysis of various materials has been conducted by other workers in the art. For example, U.S. Patent No. 2,963,487 to Perry, Jr. discloses the ozonolysis of norbornylenes to produce active ozygen-containing intermediates which are, in turn, oxidized to produce dicarboxylic acids. Further, U.S. Patent No. 2,851,465 to Bailey discloses the ozonolysis of phenanthrenes to produce the monoperoxy derivatives thereof. Other workers in the art have conducted ozonolysis procedures on various other materials.

It is an object of this invention to provide active oxygen-containings intermediates of highly halogenated bicyclo (2.2.1) heptadienes.

It is a further object of this invention to provide a process whereby valuable active oxygen-containing derivatives may be produced by the ozonolysis of highly-halogenated bicyclo (2.2.1) heptadienes. It is also an object of this invention to provide a process whereby valuable derivatives of the active oxygen-containing intermediates may be produced by treatment of the active oxygen-containing derivatives.

Broadly described, the present invention provides a process for the ozonolysis of compounds having the general formula:

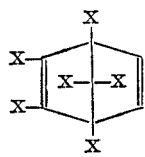

wherein X is a halogen (e.g., Cl, F or Br) to form the corresponding ozonides which comprises the steps of (1) adding a halobicyclo diolefin of the above formula to a reactive solvent, (2) passing an ozone-containing gas through said solvent-diolefin mixture at a temperature in the range of about —78° C. to about 50° C. to ozonize said compound, and (3) recovering an ozonide intermediate having the general formula:

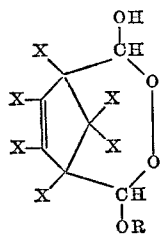

wherein X is halogen (e.g., Cl, F or Br) and R is hydrogen or lower alkyl.

In the ozonolysis of olefins, clarification of the mechanism of the initial steps of ozonization has been clouded by the instability of the "initial ozonide." In spite of the limited evidence, there seems to be little doubt that in the first step, all olefins add ozone in generally the same fashion; for example, the following illustrates the addition:

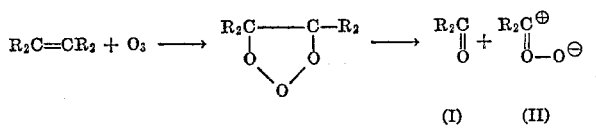

Next, the intermediate reacts with the solvent and it is thought that the reaction proceeds as follows:

(II)
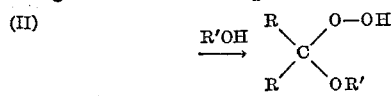

wherein R' is hydrogen, acyl or alkyl, and R is an organic radical.

One of the products (II) of the first reaction shown above and, hence, the starting material in the solvent reaction is known as the Zwitterion which has been proposed by Criegee, who reported his proposal in Record Chemical Progress (Kresge-Hooker Scientific Libraries), 18, p. 111 (1957).

The hexahalobicyclo diolefin starting materials themselves can readily be obtained, for example, by effecting a Diels-Alder reaction between, for example, hexahalocyclopentadiene and acetylene in accordance with the procedure described in Chemical Abstracts, 49, 372. Alternatively, bicyclo(2.2.1)heptadiene feed materials can be prepared by initially forming a Diels-Alder adduct of hexahalocyclopentadiene and vinyl chloride, i.e., 1,2,3,4, 5,7,7,-heptahalobicyclo(2.2.1)-2-heptene, and subsequently dehydrochlorinating the bicyclo(2.2.1)-2-heptene intermediate. Also, the heptadiene starting material can be be prepared by initially forming a Diels-Alder adduct of hexahalocyclopentadiene and vinyl acetate and subsequently pyrolyzing the adduct. Other methods of preparing hexahalobicyclo(2.2.1)heptadienes are known to the art and can be used to prepare the starting materials for this process. Examples of the materials which can be used as starting materials for this process are 1,2,3,4,7,7-hexachlorobicyclo(2.2.1)heptadiene-2,5; 1,2,3,4,7,7-hexafluorobicyclo(2.2.1)heptadiene - 2,5; 1,2,3,4,7,7 - hexabromobicyclo(2.2.1)heptadiene-2,5; 1,2,3,4 - tetrachloro - 7,7-difluorobicyclo(2.2.1)heptadiene-2,5; and the like or mixtures thereof.

The reaction mechanism of the present invention can be represeneted by the following reaction:

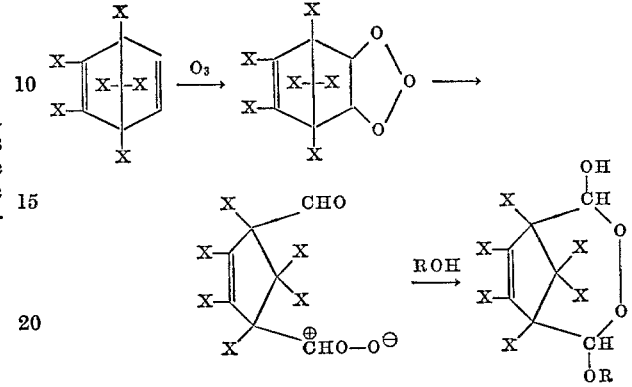

wherein R is hydrogen or alkyl.

Examples of suitable participating solvents are the $C_1$ to $C_{10}$ straight chain or branched chain primary or secondary monohydroxy aliphatic alcohols, which are reactive with ozonolysis intermediates to give a desired product, such as methanol, ethanol, propanol, isopropanol and pentanol. Further, water is an excellent participating solvent and can be used as a pure water suspension, or the water can be present as an aqueous solution (or suspension) of other materials, such as aqueous formic acid solution, aqueous acetic acid, etc. When an aqueous solution of an alkanoic acid, e.g., acetic, formic, etc., is used as the solvent, R in the formula ROH is an acyl group, i.e.,

in the case of acetic acid. The product is not isolated with this group as a substituent because the acyl group is hydrolyzed by reaction with the water present and, in such a case, R in the active oxygen-containing intermediate becomes H. Accordingly, in all cases wherein an aqueous alkanoic acid is used as the solvent, an acyl-substituted material results initially and when hydrolyzed, becomes hydrogen-substituted. The reactive material in the participating solvent has the general formula

R—OH wherein R is selected from the group consisting of hydrogen and alkyl or acyl groups, having from 1 to 10 carbon atoms and may contain non-interfering substituents. Preferably, the R group is hydrogen, alkyl having 1 to 10 carbon atoms or

wherein R in the acyl group has from 1 to 10 carbon atoms.

The ozonolysis of the halobicyclo diolefin starting material in a participating solvent yields cyclic peroxides as shown in the above equation. Examples of preferred cyclic peroxides which can be produced by this process and which depend upon the particular solvent used are as follows:

(1) When the solvent is methanol, the cyclic peroxide can be any of the following:

(a) 1,6,7,8,9,9-hexachloro-2-hydroxy-5-methoxy-3,4-dioxabicyclo(4.2.1)-7-nonene;
(b) 1,6,7,8,9,9-hexafluoro-2-hydroxy-5-methoxy-3,4-dioxabicyclo(4.2.1)-7-nonene;
(c) 1,6,7,8,9,9-hexabromo-2-hydroxy-5-methoxy-3,4-dioxabicyclo(4.2.1)-7-nonene;

(d) 1,6,7,8-tetrachloro-9,9-difluoro-2-hydroxy-5-methoxy-3,4-dioxabicyclo(4.2.1)-7-nonene; and the like.

(2) When the solvent is ethanol, the cyclic peroxide can be any of the following:

(a) 1,6,7,8,9,9-hexachloro-2-hydroxy-5-ethoxy-3,4-dioxabicyclo(4.2.1)-7-nonene;
(b) 1,6,7,8,9,9-hexafluoro-2-hydroxy-5-ethoxy-3,4-dioxabicyclo(4.2.1)-7-nonene;
(c) 1,6,7,8,9,9-hexabromo-2-hydroxy-5-ethoxy-3,4-dioxabicyclo(4.2.1)-7-nonene;
(d) 1,6,7,8-tetrachloro-9,9-difluoro-2-hydroxy-5-ethoxy-3,4-dioxabicyclo(4.2.1)-7-nonene; and the like.

(3) When the solvent is propanol, the cyclic peroxide can be any of the following:

(a) 1,6,7,8,9,9-hexachloro-2-hydroxy-5-propoxy-3,4-dioxabicyclo(4.2.1)-7-nonene;
(b) 1,6,7,8,9,9-hexafluoro-2-hydroxy-5-propoxy-3,4-dioxabicyclo(4.2.1)-7-nonene;
(c) 1,6,7,8,9,9-hexabromo-2-hydroxy-5-propoxy-3,4-dioxabicyclo(4.2.1)-7-nonene;
(d) 1,6,7,8-tetrachloro-9,9-difluoro-2-hydroxy-5-propoxy-3,4-dioxabicyclo(4.2.1)-7-nonene; and the like.

(4) When the participating solvent is water or an aqueous solution, the cyclic peroxide can be any of the following:

(a) 1,6,7,8,9,9-hexachloro-2,5-dihydroxy-3,4-dioxabicyclo(4.2.1)-7-nonene;
(b) 1,6,7,8,9,9-hexafluoro-2,5-dihydroxy-3,4-dioxabicyclo(4.2.1)-7-nonene;
(c) 1,6,7,8-tetrachloro-9,9-difluoro-2,5-dihydroxy-3,4-dioxabicyclo(4.2.1)-7-nonene;
(d) 1,6,7,8,9,9-hexabromo-2,5-dihydroxy-3,4-dioxabicyclo(4.2.1)-7-nonene; and the like.

In accordance with the present invention, a 1,2,3,4,7,7-hexahalobicyclo(2.2.1)heptadiene is added to a participating solvent. It is generally preferable to use from 0.1 to 1 mole of starting material per liter of solvent, although greater amounts up to 4 or 5 moles starting material may be employed, if desired. It will be understood that a solubilizing amount of participating or non-participating solvent will be employed, i.e., the starting material need not be entirely soluble in the solvent so long as it goes into the solution during the reaction.

An ozone-containing gas is passed through the resultant mixture in order to bring about a reaction involving the ozone, the starting material and the solvent. The ozone-containing gas should preferably comprise from about 1 to 10 weight percent, preferably about 2 to 5 weight percent, ozone in admixture with other gaseous components, such as oxygen, air, etc. The ozone-containing gas is passed through the reaction mixture at a suitable rate, which can vary over a wide range. Usually, an ozone flow-rate in the range of from about 0.005 to about 0.1 mole per minute, preferably from about 0.01 to about 0.05 mole per minute per mole starting material. However, the flow-rate of ozone increases proportionately with the size of the equipment used and may be substantially greater than mentioned above.

Although somewhat higher and lower temperatures and pressures may be employed, preferably the ozonolysis reaction is carried out at atmospheric pressures and at a temperature in the range of from about −25° C. to about 50° C.

The ozone stream usually is passed through the reaction mixture for a time requisite for no significant further absorption of ozone by the solvent reaction mixture to be observed. Longer time periods can be employed, but do not result in any additional benefits. Preferably, the passage of the ozone stream is discontinued when the relative amount of ozone absorbed to ozone fed to the reaction mixture falls below about 1 to 3%. At such conditions, ozone feed times in the range of from about 30 minutes to about 4 hours are preferred for use. Of course, these values will vary with the size of the equipment used and the conditions which are possible in, for example, the plant. This may be determined by passing the tail gas from the reactor through a potassium iodide solution, which is readily reactive with ozone, and determining the amount of iodine formed by titration with thiosulfate solution.

The cyclic peroxides produced by the ozonolysis of the hexahalobicycloheptadienes can be further treated to produce other novel and useful products; for example, the peroxide can be heated with a protonic (i.e., hydrogen donor) solvent, such as formic acid, to give an aldehydic ester hydrate having the general formula:

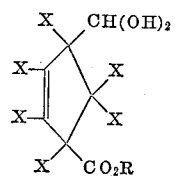

which yields upon dehydration an aldehydic ester having the general formula:

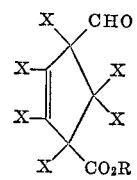

wherein X is a halogen and R is selected from the group consisting of hydrogen and lower alkyl.

The protonic solvents which can generally be used to effect rearrangement of the cyclic peroxides to the aldehydic ester hydrate can generally be any of the carboxylic acids, such as formic, acetic, propionic, butyric, isobutyric, valeric, trimethylacetic, caproic, heptylic, caprylic, pelargonic, fluoroacetic, chloroacetic, bromoacetic, iodoacetic, dichloroacetic, trichloroacetic, chloroproponic, glycolic, lactic, methoxyacetic, thioglycolic, cyanoacetic, glyoxylic, malonic, acrylic, vinyl acetic, phenyl acetic acids, and the like, including mixtures thereof. Other protonic solvents may also be used effectively.

The rearrangement of cyclic peroxides to produce aldehydic ester hydrates is usually conducted at a temperature between about 20° and 100° C., preferably about 60° to 80° C. The pressure is preferably atmospheric but is not necessarily limited thereto and can be, for example, 1 to 100 p.s.i. Best results are obtained in the rearrangement reaction when the mole ratio of cyclic peroxide to protonic solvent is from about 1:1 to about 1:5, preferably about 1:3. The time required for the reaction is from about 30 minutes to 5 hours, preferably about 1 to 3 hours.

In the rearrangement reaction, the cyclic peroxide can be added to an aqueous solution of the protonic solvent or solvents and agitated at a temperature of about 20° to 100° C. for a time sufficient to rearrange the cyclic peroxide to an aldehydic ester hydrate. A pure product can be recovered by convenient recovery procedures, for example, by quick-freezing the product and recrystallizing from a solution of the product in a solvent.

The aldehydic ester hydrate can be converted to an aldehydic ester by dehydration of the hydrate. The dehydration may be conducted by any of the conventional techniques, for example, by drying in vacuo over phosphorus pentoxide, by pyrolysis, by drying over phosphrous oxychloride, etc.

The cyclic peroxides may also be oxidized with an inorganic acid or salt, such as nitric acid, chromic acid, potassium dichromate, potassium permangante, fuming sulfuric acid (e.g., $SO_3$), and the like, to produce a dicarboxylic acid having the general formula:

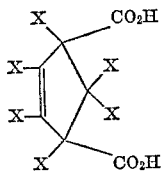

wherein X is halogen (e.g., chlorine, bromine, fluorine).

This reaction is preferably conducted by adding the cyclic peroxide to the concentrated acid or salt solution, the mole ratio of cyclic peroxide to acid being about 1:3 to 3:1, preferably about 1:2. The mixture is heated at a temperature of about 75° to 150° C., preferably about 75° to 100° C., for a period of time sufficient to oxidize the cyclic peroxide, for example, about 30 minutes to 3 hours, preferably about 45 minutes to 90 minutes.

The dicarboxylic acid can be recovered and used as is, or it may be esterified to produce the useful dialkyl ester. This dialkyl ester has the general formula:

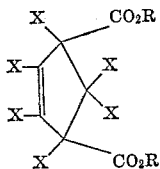

wherein X is a halogen and R is an alkyl having from 1 to 5 carbon atoms, preferably from 1 to 3 carbon atoms.

In this reaction, a strong alkylating agent, such as a diazoalkyl compound is reacted with a solution of the dicarboxylic acid. Preferably, it is desired to produce the dimethyl ester of the acid; thus, a methylating agent, e.g., diazomethane, is used. The reaction can be conducted by adding a solution of the dicarboxylic acid, e.g., an ethereal solution, to a solution of the methylating agent, e.g., an ethereal solution of diazomethane in a mole ratio of acid to methylating agent of about 1:1 to 1:3, preferably about 1:2.

Although the temperature, pressure and time of the reaction depend upon the equipment available and are dependent upon one another, a temperature of about 5° to 70° C., preferably about 15° to 40° C., a pressure of about 1 to 100 p.s.i., preferably about 10 to 30 p.s.i., and a time of about 5 minutes to 24 hours, preferably about 15 minutes to 1 hour, are used.

Alternativley, the ozonolysis of halobicyclo diolefins may be conducted in the presence of a non-participating solvent, such as carbon tetrachloride, to produce a polymeric ozonide. Thus, the present invention provides a process for the ozonolysis of compounds having the general formula:

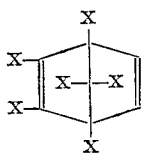

wherein X is a halogen (e.g., chlorine, fluorine or bromine) to form the corresponding ozonides, which comprises the steps of (1) adding a halobicyclo diolefin of the above formula to a non-participating solvent, (2) passing an ozone-containing gas through said solvent-diolefin mixture at a temperature in the range of about −78° C. to about 50° C. to ozonize said compound and (3) recovering an ozonide intermediate having the general formula:

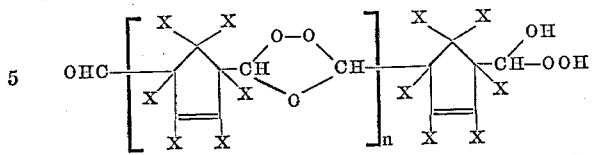

wherein X is halogen (e.g., chlorine, bromine or fluorine) and $n$ is an integer from 1 to 10, preferably from 2 to 4.

In the ozonolysis of olefins, when the reaction is conducted in the presence of a non-participating solvent, the following reaction mechanism is evidenced:

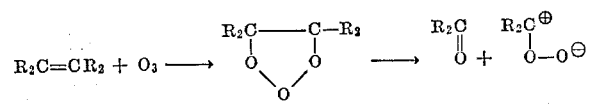

which reaction then proceeds to form the classical ozonide:

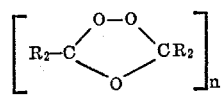

The classical ozonide is a polymer if the starting material is a cyclic olefin whose cleavage results in the formation of a difunctional material.

In accordance with this alternative embodiment of the invention (1) a hexahalobicyclo diolefin starting material, as described above, is added to a non-participating solvent; (2) an ozone-containing gas is passed through the solvent-diolefin mixture at a temperature in the range of about −78° C. to about 50° C. to ozonize the diolefin; and (3) the polymeric ozonide is recovered.

The solvent which is used in this reaction can be any of the non-participating solvents, i.e., those which do not react with the ozonide intermediates. For example, the solvent may be an alkyl halide, e.g., carbon tetrachloride, ethylene chloride and ethylene dichloride, a saturated aliphatic solvent, e.g., heptane, pentane, octane, etc., and any other solvent which does not participate in the reaction and which satisfies the reaction requirements.

It is generally preferable to incorporate from 0.1 to 1 mole of hexahalobicyclo diolefin per liter of solvent, although greater amounts up to 4 or 5 moles starting compound may be employed, if desired. It will be understood that an amount of non-participating solvent which is sufficient to solubilize one starting material will be employed, i.e., the starting material need not be soluble in the solvent so long as it goes into solution during the reaction.

An ozone-containing gas is passed through the resultant reaction mixture in order to bring about a reaction involving the ozone and the starting material. The ozone-containing gas should preferably comprise from about 1 to 10 weight percent, preferably about 2 to 5 weight percent, ozone in admixture with other gaseous components, such as oxygen, air, etc. The ozone-containing gas is passed through the reaction mixture at a suitable rate, which can vary over a wide range. Usually, an ozone flow-rate in the range from about 0.005 to about 0.1 mole per minute, preferably from about 0.01 to about 0.05 mole per minute per mole hexahalobicyclo diolefin is used. However, flow rate of ozone increases proportionately with the size of the equipment used and may be substantially greater than mentioned above.

Although somewhat higher and lower temperatures and pressures may be employed, preferably the ozonization reaction is carried out at atmospheric pressures and at a temperature in the range of from about −78° C. to about 50° C.

The ozone stream usually is passed through the reaction mixture for a time period requisite for no significant further absorption of ozone by the solvent reaction mixture to be observed. Longer time periods can be employed, but do not result in any additional benefits. Preferably, the passage of the ozone stream is discontinued when the relative amount of ozone absorbed to ozone fed to the reaction solvent mixture falls below about 1 to 3%. At such conditions, ozone feed time periods in the range of from about 30 minutes to about 4 hours are preferred for use. Of course, these values will vary with the size of the equipment used and the conditions which are possible, for example, in the plant. The relative amount of ozone absorbed to ozone fed may be determined by passing the tail gas from the reactor through a potassium iodide solution, which is readily reactive with ozone, and determining the amount of iodine formed by titration with a thiosulfate solution.

The dicarboxylic acid produced above by oxidizing the cyclic peroxide may, alternatively, be produced in a one-step procedure, e.g., by oxidative ozonolysis of the hexahalobicyclo diolefin starting material. In such a process, the hexahalobicyclo diolefin is added to an organic acid solvent, for example, acetic acid. The amount of solvent employed is enough to provide from about a 2% to about a 10% by weight solution of the hexahalobicyclo diolefin. An ozone-containing gas is then passed through the reaction mixture at a suitable temperature and pressure and for a sufficient time to produce an ozonide intermediate.

The ozonolysis intermediate (i.e., active oxygen-containing intermediate) is then converted into the desired halogenated pentene dicarboxylic acid by treating said intermediate with an excess of oxygen in the presence of water. Although the intermediate preliminarily can be recovered from the reaction mixture prepared in the ozonization reaction, the reaction mixture is preferably treated directly.

Although any suitable source of oxygen suitably can be employed to convert the ozonide into the desired halogenated pentene dicarboxylic acid, preferably this treatment is carried out by means of an acidic aqueous solution of a water-soluble peroxide, e.g., hydrogen peroxide. The preferred hydrogen peroxide solution is formed by mixing about equal volumes of 0.5 to 1.2 normal sulfuric acid and an aqueous 40 to 60% hydrogen peroxide solution.

The intermediate can be treated with the oxygen-containing material at ambient or slightly elevated temperatures for a time ranging from about 30 minutes to about 3 hours. The corresponding highly-halogenated cyclopentene dicarboxylic acid can be recovered by any suitable technique from the reaction mixture above. The preferred method is shown in Example II (below).

The product from this reaction also could be reacted with the diazo alkane reactant as above to produce the desired dimethyl ester of the dicarboxylic acid.

It will be apparent, therefore, that a wide variety of products are obtainable in accordance with the process of this invention. Thus, cyclic peroxide can be prepared and isolated. The peroxides can be recovered from the reaction mixture by any suitable means, such as, for example, by evaporation of the solvent. The cyclic peroxides are very useful compounds as such and as intermediates, e.g., the cyclic peroxides are useful as latent free radical initiators since they are very stable until heated above their melting point. Further, the cyclic peroxides can be used as synergists for flame retarding alkenyl aromatic thermoplastic polymers such as are described in U.S. Patents Nos. 3,058,927, 3,058,928, and 3,058,929 to Eichhorn and Vanderhoff et al. Also, the cyclic peroxide is a useful intermediate for the production of aldehydic esters and hydrates thereof which find utility as insecticides and/or herbicides.

Also, trimers can be prepared by ozonization of the hexahalobicyclo diolefin in a non-participating solvent. These trimers are quite useful as insecticides and/or herbicides.

The dibasic acid produced by oxidation of the cyclic peroxide or produced by the one-step ozonation-oxidation of the hexahalobicyclo diolefin is useful in the preparation of synthetic resins such as polyesters, polyamides and polyurethanes. Further, the dibasic acid, when used in this preparation, imparts flame-retardant properties to the various resins produced therefrom. Also, the dibasic acid is useful as an intermediate to produce its dimethyl ester, which is useful as an insecticide and/or herbicide.

The cyclic peroxides are likewise useful as insecticides and/or herbicides.

The present invention will be further illustrated by the following specific examples which are given by way of illustration and are not intended as limitation on the scope of this invention.

Example I

Preparation of 1,2,3,4,7,7-hexachlorobicyclo(2.2.1) heptadiene.

To a solution of about 16.75 g. of potassium hydroxide in about 134 ml. of absolute ethanol were added 33.5 g. of 1,2,3,4,5,7,7-heptachlorobicyclo(2.2.1)-2-heptene. The resulting mixture was refluxed with stirring for about 4 hrs. and then, without heating, was stirred for an additional 3 hrs. At the end of this time period, the insoluble material in the mixture obtained was removd by filtering and then most of the ethanol was removed from the filtrate by evaporation on a steam bath. The concentrate thereby prepared was then diluted by an addition of about 33.5 ml. of water and a solution of about 23.4 ml. of hydrochloric acid in 50 ml. of water. The resultant diluted mixture was then extracted several times with about 33.5 ml. portions of ether. Separation of the ether from the extract provided about 26.6 g. (about 92% yield) of a clear oil product which chromatographic studies showed to be 1,2,3,4,7,7-hexachlorobicyclo(2.2.1)heptadiene.

Example II

A solution of 36 g. of moist 1,2,3,4,7,7-hexachlorobicyclo(2.2.1)heptadiene in 130 ml. of glacial acetic acid was contacted at room temperature with a stream of ozone at a rate of about 62.8 mg./min. over a period of about 87 minutes. To the ozonized mixture were added 20 ml. of 50% hydrogen peroxide and 20 ml. of 1 M sulfuric acid; the resulting mixture was stirred overnight. An oil separated from the aqueous layer; the oil was then decanted. The aqueous layer was extracted four times with 50–75 ml. portions of ether after which the extracts were combined and dried over anhydrous magnesium sulfate. Evaporation of the ether gave a solid residue which was recrystallized three times from an ethylacetate-hexane solvent couple to give 2.6 g. of a white powdery solid; this represents a 6% yield. Analysis of the product proved the formation of 1,2,2,3,4,5-hexachloro-4-cyclopentene-1,3-dicarboxylic acid. This analysis was conducted by melting point determination (258–9° C.), infrared, and acid number. Elemental analysis of the product also proved the structure:

*Analysis.*—Calculated for $C_7H_2Cl_6O_4$: C, 23.17; H, 0.56; Cl, 58.63. Found: C, 23.59; H, 0.54; Cl, 59.00.

Example III

The procedure of Example II is repeated with the exception of substituting 1,2,3,4,7,7-hexabromobicyclo (2.2.1)heptadiene for the 1,2,3,4,7,7-hexachlorobicyclo (2.2.1)heptadiene. The product obtained is found to be 1,2,2,3,4,5-hexabromo-4-cyclopentene-1,3-dicarboxylic acid.

Example IV

A solution of 20 g. (0.067 mole) of 1,2,3,4,7,7-hexachlorobicyclo(2.2.1)heptadiene in 125 ml. of carbon tetrachloride was ozonized by passing a stream of about 2 to 5 wt. percent ozone in oxygen through the mixture at 0° C. and at a rate of 56–72 ml. of ozone per minute until about 25% excess ozone had been provided. The ozone was generated from aviation breathing grade oxygen by a Model T-23 ozonator manufactured by the Welsbach Corporation, Philadelphia, Pa. After stripping the solvent in vacuo, 20.6 g. of a white solid remained. Thin layer chromatography showed that the product was chiefly one component. The product was recrystallized 3 times from a chloroform-hexane solvent couple to give a polymeric ozonide. The structure was proved by infrared spectrum, n.m.r. spectrum, active oxygen determination, and elemental analysis. Further, the molecular weight was calculated as 1058.37 and found to be 1044 and 1089. Elemental analysis of the product further proved the structure:

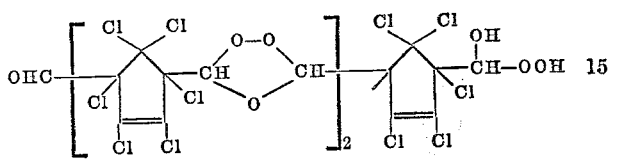

*Analysis.*—Calculated for $C_{21}H_8Cl_{18}O_{10}$: C, 23.83; H, 0.76; Cl, 60.29. Found: C, 23.92; H, 0.74; Cl, 60.11.

Example V

A solution of 20 g. of 1,2,3,4,7,7-hexachlorobicyclo(2.2.1)hepta-2,5-diene in 25 ml. of pentane was ozonized as in Example IV by passing a stream of ozone-containing gas through the reaction mixture at 0° C. until about 25% excess ozone had been provided. The solvent was stripped in vacuo, leaving a white solid which was analyzed by the procedures outlined in Example IV and found to be the same trimer as was produced by Example IV.

Example VI

A solution of 20 g. of 1,2,3,4,7,7-hexachlorobicyclo(2.2.1)hepta-2,5-diene and 75 ml. of methanol were contacted with a stream of ozone-containing gas as outlined in Example IV. Evaporation of the solvent (methanol) in vacuo left an off-white, viscous liquid which provided 17.3 g. of solid after being washed several times with hexane. The solid was recrystallized from carbon tetrachloride to give a white crystalline material which was shown to be 1,6,7,8,9,9 - hexachloro-2-hydroxy-5-methoxy-3,4-dioxabicyclo(4.2.1)-7-nonene. The compound was proved to have this formula by melting point determination, infrared spectrum, molecular weight determination, active oxygen determination and elemental analysis. The molecular weight was calculated as 378.83 and found to be 408. Elemental analysis of the product further proved the structure:

*Analysis.*—Calculated for $C_8H_6Cl_6O_4$: C, 25.36; H, 1.59; Cl, 56.15. Found: C, 25.38; H, 1.61; Cl, 56.46.

Example VII

About 5 g. of the cyclic peroxide obtained in Example VI was placed in a solution consisting of 50 ml. of 90% formic acid and 6 ml. of 50% hydrogen peroxide, and the mixture was stirred at 40–50° C. for 2 hrs. During the stirring, heat was released and the temperature temporarily increase to 70–75° C. On cooling, a bright yellow oil was obtained which, when quick-frozen in a Dry Ice-acetone bath and brought back to room temperature twice, produced 2.5 g. of a solid. Recrystallization of the solid from an acetone-hexane solvent couple gave white crystals, melting point 98–100° C. These crystals were proved to be the hydrate of 1,2,2,3,4,5-hexachloro-4-cyclopentene-3-aldehydic-1-methyl carboxylate, by the melting point determination, infrared spctrum and molecular weight determination. When the sample was dried in vacuo over phosphorus pentoxide, a new white crystalline compound was produced with a melting point of 70–71° C. This compound was shown to be the aldehydic ester mentioned above by infrared spectrum, n.m.r. spectrum, and elemental analysis, the analysis being:

*Analysis.*—Calculated for $C_8H_4Cl_6O_3$: C, 26.60; H, 1.12; Cl, 58.95. Found: C, 26.50; H, 1.25; Cl. 58.09.

Example VIII

A solution of 3.79 g. of the cyclic peroxide produced in Example VI in 60 ml. of 50% formic acid was heated on a steam bath for one hr. After the solution was left to stand several days at room temperature, 1.8 g. of a white crystalline solid precipitated. This solid was shown to be the aldehydic ester of Example VII by the infrared spectrum and melting point. The same type of reaction was attempted using carbon tetrachloride as a solvent and only the original cyclic peroxide was recovered. Also the peroxide was treated in ethanol, resulting in a mixture of products which were not isolated.

Example IX

A solution of 20 g. (0.065 mole) of the hexachlorobicyclo starting material in 120 ml. of 90% formic acid was ozonized by the method of Example IV. To this solution were added 18 ml. of 50% hydrogen peroxide, and then a stream of ozone-oxygen at an ozone flow rate of 34 mg./min. was bubbled into the solution for 2 hrs. The reaction mixture was cooled in an isopropanol-Dry Ice bath, and an oil solid was obtained and filtered. The solid was washed with dater and dried in vacuo. A yellow, powdery solid (14.3 g.) was obtained, which, upon recrystallization from a carbon tetrachloride-ethylacetate solvent couple, gave white crystals. These crystals were dried in vacuo over phosphorus pentoxide at 65° C. to constant weight. The compound 1,6,7,8,9,9-hexachloro-2,5 - dihydroxy-3,4-dioxabicyclo(4.2.1)-7 - nonene was shown by melting point determination (138–139° C.), infrared, molecular weight (calculated, 364.80; found, 365) and elemental analysis:

*Analysis.*—Calculated for $C_7H_4Cl_6O_4$: C, 23.05; H, 1.10; Cl, 58.31. Found: C, 23.46; H, 1.01; Cl, 58.14.

Example X

The hexachlorobicyclo diolefin starting material was added to various aqueous solvents and the ozonolysis procedure of Example IV was conducted, except that a temperature of 25° C. was used. The solvent systems were as follows:

(1) A 50% solution of aqueous formic acid, a 50% aqueous solution of hydrogen peroxide and dilute aqueous sulfuric acid;

(2) Aqueous sodium hydroxide (2 mole equivalents) and a 50% solution of hydrogen peroxide (1.5 mole equivalents), and (3) Water and a 50% solution of hydrogen peroxide in dilute sulfuric acid.

Each of the reactions results in the production of 1,6,7,8,9,9 - hexachloro-2,5-dihydroxy-3,4-dioxabicyclo(4.2.1)-7-nonene, which was proved by the infrared spectrum and the melting point.

Example XI

To 25 ml. of an ethereal solution of about 0.2 g. of diazomethane was added dropwise a solution of 0.42 g. of 1,2,2,3,4,5 - hexachloro-4-cyclopentene-1,3-dicarboxylic acid in 10 ml. of ether. After the reaction mixture was stirred at room temperature for 3 days, the mixture was filtered and evaporated in vacuo to give a tan solid which, after recrystallization in carbon tetrachloride, gave 0.2 g. of white crystals, melting point 138–139° C. This product was shown to be the dimethyl ester of the treated acid by vapor phase chromatography and infrared spectrum and by elemental analysis as follows:

*Analysis.*—Calculated for $C_9H_6Cl_6O_4$: C, 27.66; H, 1.55; Cl, 54.42. Found: C, 27.31; H, 1.41; Cl, 54.14.

Example XII

A mixture of 1.9 g. of the cyclic peroxide produced in

Example VI and 15 ml. of 70% nitric acid was heated on a steam both, while being rapidly stirred, for 1 hr. When the mixture was allowed to cool slowly to room temperature, without stirring, white crystals appeared which were then filtered and washed with cold water. The white crystals were recovered. The filtrate was extracted several times with ether, and the combined ether extracts were washed with water before they were dried over anhydrous magnesium sulfate. After evaporation of the ether solution, an off-white material was left. The off-white material was then washed with hot carbon tetrachloride to give, along with the white crystals, 0.55 g. of a solid which was shown to be the dicarboxylic acid by the infrared spectrum, melting point and thin layer chromatography.

Example XIII

The cyclic peroxide produced in Example VI was oxidized with nitric acid under the conditions given in Example XII. After evaporation of the solvent and washing with hot carbon tetrachloride, the reaction product was shown to be 1,2,2,3,4,5-hexachloro-4-cyclopentene-1,3-dicarboxylic acid by the infrared spectrum, melting point, and thin layer chromatography.

It is claimed:
1. A class of compounds having the formula

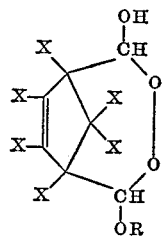

wherein X is a halogen and R is a member selected from the group consisting of hydrogen and a primary or secondary alkyl having from 1 to 10 carbon atoms.
2. The compound of claim 1 wherein R is hydrogen.
3. The compound of claim 1 wherein R is methyl.
4. 1,6,7,8,9,9 - hexachloro - 2-hydroxy-5-methoxy-3,4-dioxabicyclo(4.2.1)-7-nonene.
5. 1,6,7,8,9,9 - hexachloro - 2,5-dihydroxy-3,4-dioxabicyclo(4.2.1)-7-nonene.
6. A process which comprises the steps of adding to a participating solvent consisting of water, 0.1–5 mols per liter of said solvent of a hexahalobicyclodiolefin of the formula

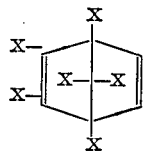

and passing a gas containing 1–10% by weight ozone at a rate of 0.005–0.1 mol of ozone per minute at atmospheric pressure through the mixture at a temperature of −25° to 50° C. to ozonize said diolefin, and recovering a peroxide compound of the formula

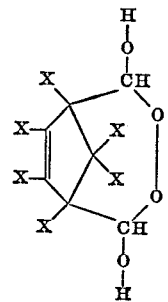

wherein X is halogen
7. A process which comprises the steps of adding to a participating solvent consisting of an organic carboxylic acid which is dissolved in water, 0.1–5 mols per liter of said solvent of a hexahalobicyclodiolefin of the formula

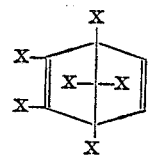

and passing a gas containing 1–10% by weight ozone at a rate of 0.005–0.1 mol of ozone per minute at atmospheric pressure through the mixture at a temperature of −25° to 50° C. to ozonize said diolefin, and recovering a peroxide compound of the formula

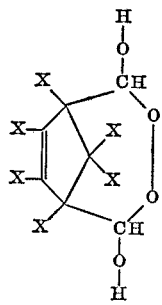

wherein X is halogen.

References Cited

UNITED STATES PATENTS 2,851,465  9/1958  Bailey _____ 260—339
2,969,376  1/1961  Perry _____ 260—338

OTHER REFERENCES

Chem. Reviews, vol. 27, pp. 437 and 450–451, 1940, "The Ozonization Reaction" by Louis Long, Jr.

NORMA S. MILESTONE, Primary Examiner.

S. WINTERS, Assistant Examiner.

U.S. Cl. X.R.

71—2.5, 2.6; 260—339, 468, 514, 2.5, 75, 78, 77.5, 999